137-13 SR
10/15/85 XR 4,546,612

United States Patent [19]
Santhanam
[11] Patent Number: 4,546,612
[45] Date of Patent: Oct. 15, 1985

[54] METHOD OF PRODUCING FREE FLOWING SOLIDS

[75] Inventor: Chakra J. Santhanam, Lexington, Mass.
[73] Assignee: Arthur D. Little, Inc., Cambridge, Mass.

[21] Appl. No.: 581,704
[22] Filed: Feb. 21, 1984
[51] Int. Cl.[4] .......... F17C 7/02
[52] U.S. Cl. .......... 62/55; 137/13; 406/154; 406/197; 423/437
[58] Field of Search .......... 62/46, 47, 48, 55; 423/437; 137/13; 406/197, 154

[56] References Cited
U.S. PATENT DOCUMENTS
3,933,001 1/1976 Muska .......... 62/47
4,206,610 6/1980 Santhanam .......... 62/55

*Primary Examiner*—Frank Sever
*Attorney, Agent, or Firm*—Richard J. Hammond

[57] ABSTRACT
A process as disclosed forming a non-agueous, free-flowing composition. The process involves treating a finely divided inorganic or organic material with liquid carbon dioxide to form a slurry. The treated material is separated from the slurry and shows suprising free-flowing, nonagglomerated behavior.

12 Claims, 3 Drawing Figures

METHOD OF PRODUCING FREE FLOWING SOLIDS

The present invention relates to a nonaqueous, free flowing composition and a process for producing such. Finely divided powders have found important uses in connection with fire extinguishers, pesticides, medicinal and cosmetic products etc. This invention is broadly applicable to any of these products as well as to a method of disseminating and transporting such finely divided powders.

A major problem in connection with conventional powder dissemination compositions has been the packing and clogging of the powders. In particular, conventional powder dissemination compositions are subject to the settling of finely divided powder particles which form masses. The settled powder masses are difficult to break up and tend to clog feed pipes, valves, nozzles and other parts of the apparatus used to disseminate the particles.

Another disadvantage of conventional finely divided powder dissemination compositions has been the relatively high volume occupied by the finely divided powders because of the interstitial spaces between the powder particles occupying a large proportion of the total volume of the total composition. This has resulted in relatively small weight capacities per unit volume for the powder dissemination composition.

In addition, the powder particles of conventional powder dissemination compositions have a tendency to agglomerate or sinter. This causes difficulties in terms of transport and discharge of the powders and makes it necessary to add means for deagglomeration of the agglomerated or sintered powders. This is often difficult and sometimes impossible. As a result, it is often necessary to avoid using very fine particles, such as in the micron size range, which effectively form a cloud to smother a fire.

Another problem with prior art compositions occurs when it is desired to use more than one type of powder in the composition but it is not possible to mix them because they react with each other. This problem would occur, for example, when it is desired to use bicarbonates with acid phosphates.

The present invention is distinguishable from conventional powder dissemination compositions and is an improvement over the composition disclosed in U.S. Pat. No. 3,402,665 of Tarpley, Jr., et al and U.S. Pat. No. 4,234,432 of Tarpley. The patents disclose a nonpyrotechnic disseminator wherein the material to be disseminated may comprise finely divided powders suspended within a gelled liquid which comprises at least a portion of liquefied gas. In the latter patent the powders have a distinct advantage over other compositions due to the higher weight to volume ratio made possible by utilizing powders having at least a bimodal particle size distribution.

The present invention comprises a dry, free-flowing composition substantially free of flow promoting and anti-agglomerating agents and a process for forming such compositions, the process that comprises providing an organic or inorganic material in finely divided form; treating said material with liquid carbon dioxide to form a slurry; and separating said treated material from said slurry.

DESCRIPTION OF THE PREFERRED EMBODIMENTS

Although the present invention is applicable to the broad field of powder dissemination technology, "dissemination technology" as used herein is meant in its broadest term and includes not only spraying or dusting but also various forms of powder transport, either alone or in slurry form, it will be described in more detail with particular reference to the use of powder dissemination composition as fire extinguishing agents. Any modifications which may be necessary in applying the present invention to other technologies may be readily determined by those skilled in the powder disseminating art.

In the method of this invention, liquid and gaseous carbon dioxide is used as a treating agent for the finely divided particulate material. The particulate material forms a pumpable slurry when mixed with the liquid carbon dioxide and subsequent to treatment can be pneumatically conveyed in any medium, such as air, carbon dioxide, etc. The particles must be sized to pass a U.S. 50-mesh screen, i.e., the particles should be no greater than about 300 μm in diameter. A minor percentage (e.g., up to about 40% by weight) of the materials may be sized fine enough to pass a 325 mesh screen (40 μm in diameter). It is, however, preferable to use a material having a controlled particle size distribution, this distribution being optimized for the viscosity of the liquid carbon dioxide being used as detailed below. The size distribution of the particles should preferably be that which gives rise to a stable slurry, i.e., a slurry from which the particles will not settle out to any appreciable degree. While a mono-disperse system of particles may be used, it should be noted that the particle dispersion, i.e., uniformly sized particles or particles having a range of sizes, is not critical. However, in disseminating uniformly sized particles, velocity distribution must be high enough for suspension of all the particles, but resuspension is less of a problem than with polydispersions. By using particulate that includes minor amounts of fine material, i.e., under 40 μm as well as coarse material, i.e., those passing through a 100 mesh screen, the fines create a liquid viscosity (apparent), that supports the coarse particles, thereby promoting better slurry flow. Similarly, this combination of coarse and fine particles is also advantageous in causing the facile flow of dry particulates treated in accordance with the present invention.

In U.S. Pat. No. 4,206,610 a novel method for transporting coal has been disclosed which comprises suspending coal in finely divided form in liquid carbon dioxide to form a coal/liquid carbon dioxide slurry and pumping the slurry from a coal source point to a coal use point through a pipeline under conditions of temperature and pressure to maintain essentially all of the carbon dioxide in liquid form. According to a preferred embodiment of this method, the carbon dioxide is maintained at a temperature between about −20° C. and 30° C. and at a pressure between about 20 and about 200 atmospheres. This patent also discloses a novel apparatus for transporting coal in finely divided form from a coal source point to a coal use point which comprises, in combination, slurry forming means at a coal source point to form a coal/liquid carbon dioxide slurry; deslurrying means at a coal use point to deslurry the coal/liquid carbon dioxide slurry to provide coal for combustion and essentially coal-free carbon dioxide; and slurry pipeline means connecting the slurry forming means the the deslurrying means arranged to carry the coal/liquid carbon dioxide slurry under conditions of temperature and pressure to maintain essentially all of the carbon dioxide in liquid form.

I have now found that the use of a finely divided inorganic or inorganic material treated with liquid carbon dioxide and used in conjunction with a gaseous medium, such as air or carbon dioxide makes it possible to handle, store, transport and disseminate such materials, in an unexpected, facile manner.

In preparing the composition of the present invention from about 30 to about 70 volume percent of the powder is used, the remainder being liquid carbon dioxide. Normally, there is no advantage in having the powder percentage below about 30 volume percent, since the desired properties of the composition are to a large degree dependent upon the amount of powder present in the composition. Generally, the flow properties and handling characteristics of the composition may be adversely affected when the powder is present in greater than about 70 volume percent. The powder should be substantially insoluble in the liquid carbon dioxide at ambient temperatures.

The chemical nature of the powders to be used in the composition of the present invention will vary depending upon the intended use of the invention. Unlike prior dry powder dispensing compositions, it is not necessary to include flow promoting additives and anti-agglomerants in the finely divided powders of the present invention. Thus, because of the characteristics of the present invention, no useful purpose is served by the addition of such flow promoting additives and/or anti-agglomerants.

In general, any powder capable of being produced in at least the above particle size is contemplated by the present invention. The characteristics of the powder generally tend to define the characteristics of the composition.

Illustrations of the finely divided particles useful in preparing the free-flowing compositions of this invention are those including iron ore, e.g., hematite, magnetic iron oxide, etc., limestone, sulfur, potash, copper concentrate, gilsonite, etc.

The present invention has as a preferred embodiment a fire extinguishing agent with powder whose average approximately maximum dimension is between about 0.01 micron and about 100 microns. The powder particles may be equiaxed and relatively free from jagged edges or corners. In some instances, flaked particles may be desirable, such as flaked mica. Other desirable shapes for the particles include fibers, needles or lacy crystals.

As noted herein, after treatment with liquid carbon dioxide, the separated and treated particulate material becomes free-flowing. Because of this, it is possible to transport those treated solids pneumatically and in dense phase. As such, the gas (typically carbon dioxide) to treated solids ratio can be as high as 1:5 to 1:50 with transport velocities in the range of 4–10 feet/second. This contrasts greatly with present day dilute phase transport of gas:solid of less than 1:5 at 100 feet/second. Because of such dense phase transport, reduction in pipe wear is achieved as well as minimal carrier gas consumption.

By way of illustration, when the composition of the present invention is intended for use as a fire extinguisher, the following exemplary materials may be used as the powder component; potassium bicarbonate, flake and expanded mica, sodium bicarbonate, boric acid, ammonium hydrogen phosphate, borax, potassium bromide, potassium chloride, borax-boric acid mixtures, strontium bromide, ammonium bicarbonate, ammonium pentaborate, ammonium bromide, tetrabromophthalic anhydride, tetrabromobisphenol, iodoform, etc.

The present invention includes the optional use of mixtures of powders. Thus, for particular purposes where it is desirable to confer multiple properties to a composition for a particular situation, the powders may be blended such as by dry blending prior to being admixed in the compositions of the present invention. A significant advantage of the present invention is that mixtures of powders may be stored together as part of the composition. This is generally not feasible in dry mixes due to the packing, agglomeration and sintering of the particles. Normally interactive powders, such as bicarbonates and acid phosphates may be stably mixed and stored together as part of the present composition, since the liquid carbon dioxide separates the interactive powder particles.

In some situations, a surfactant may be added to improve wetting of the finely divided powders. Although generally not necessary, where a surfactant is desired, it should be present in a concentration of about 0.1 to about 1 weight percent based on the amount of liquid carbon dioxide in the composition. Suitable surfactants include, for example, sorbitan trioleate, polyethylene glycol ether of hydroabietyl alcohol, polyoxyethylene sorbitan monooleate, diethylene glycol laurate, sulfonated castor oil, triethanolamine monooleate, etc.

The compositions of the present invention are stored within standard storage containers having a structural strength sufficient to withstand the pressures developed under storage and use temperatures. Generally, these pressures will be of the order of 15 to 250 p.s.i.g. at room temperature. Suitable storage containers include any of the standard pressurized fire extinguisher containers as well as the containers disclosed in U.S. Pat. No. 3,402,665 of Tarpley, Jr., et al.

The invention will now be described in more detail with reference to the following specific non-limiting examples. In preparing the compositions according to the present invention, the ingredients are typically mixed together in a pressurized high shear mixer at ambient temperature to avoid evaporation of volatile liquids or of the liquefied gas.

As noted earlier, this invention involves the transport of finely divided powders. Such transport can include the dispersion and delivery of such powders through spray or other nozzles as in the case of fire extinguishers and the like or the actual physical movement of large quantities of such powder either without other materials as in slurry form by means of pipelines. The latter transport is typically accomplished by combination of the particulate matter with the liquid carbon dioxide to form a slurry. The use as for example, fire extinguishing compositions however, does not rely on liquid being present with the powder but on the beneficial free-flowing effect of first treating the particulate material with liquid carbon dioxide and then separating the two components.

Figure 1:
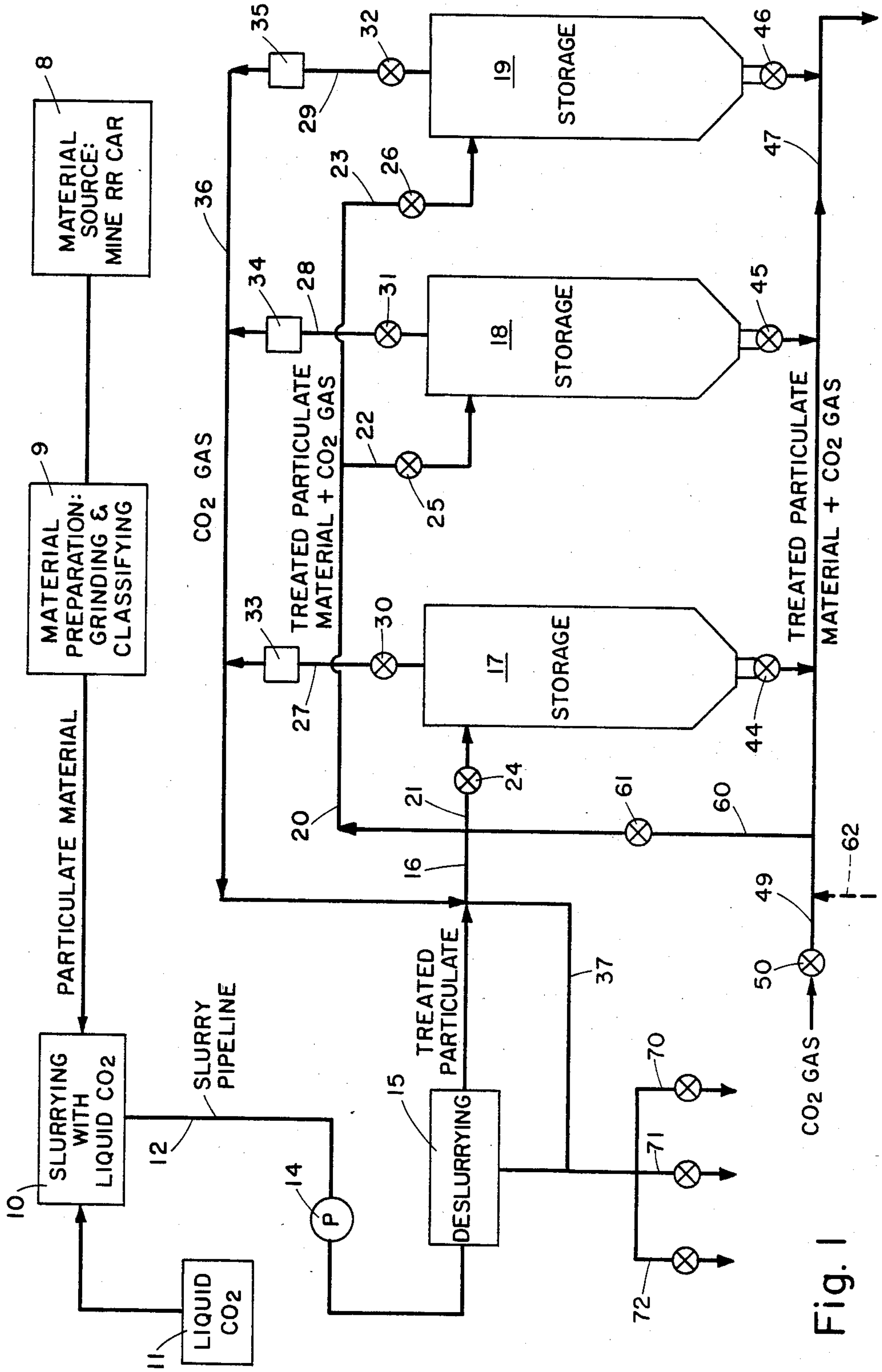
FIG. 1 shows a slurry transport scheme of the instant invention.

Illustrative of the slurry transport is FIG. 1. The finely divided material to be treated may originate at any suitable source point 8. The particulate matter is prepared for slurrying at a preparation point 9 by reducing it to the desired particle size distribution, e.g., by grinding or other well-known technique and, if necessary, classifying with respect to particle size. Such preparation and handling follow standard procedures and may be carried out in conventional, commercially available equipment. The finely divided particulate material is then slurried at 10 with liquid carbon dioxide supplied from a suitable source 11, e.g., a pressurized storage vessel. The carbon dioxide may, if desired, be obtained by burning coal and recovering it in essentially pure form from the combustion gases; or it may be recycled from a slurry delivery point; or any suitable combination of such sources may be used.

Although the pressure of the liquid carbon dioxide in the slurry as it is pumped by pump 14 through the pipeline 12 will range between about 20 and about 150 atmospheres and the temperature will range between about −20° C. and 30° C., liquefaction and storage of the carbon dioxide need not be carried out within this range since adjustments in pressure and temperature may be made as the liquid carbon dioxide is conducted from storage to the slurrying equipment.

Figure 2:
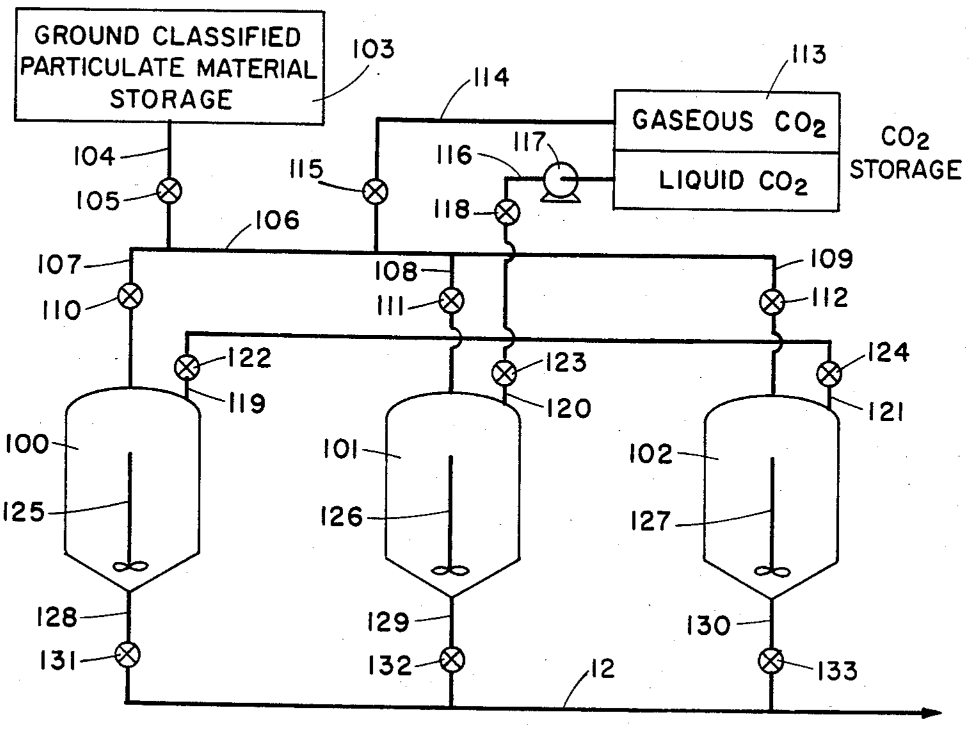
FIG. 2 shows an embodiment of the invention suitable for forming liquid carbon dioxide slurry.

FIG. 2 illustrates an embodiment of the method and apparatus suitable for forming the liquid carbon dioxide slurry. This embodiment, is based on slurrying successive batches of particulate matter. As will be seen in FIG. 2, there are provided a number of pressurizable storage containers 100, 101, and 102 which are connected to a particulate storage container 103 through a conduit 104 having a valve 105 and communicating with a main conduit 106. Branch conduits 107, 108, and 109, having valves 110, 111 and 112, respectively, lead from main conduit 106 to the pressurizable container. A liquid carbon dioxide storage vessel 113 provides both gaseous carbon dioxide, through line 114 and valve 115, and liquid carbon dioxide through line 116, pump 117 and valve 118, to the pressurizable container, by way of branch conduits 119, 120 and 121 having valves 122, 123 and 124, respectively. Each of the containers is equipped with a suitable stirring means 125, 126 and 127 and each has a slurry discharge line, 128, 129 and 130, controlled by valves 131, 132 and 133, respectively, and communicating with main slurry pipeline 12.

The operation of the apparatus of FIG. 2 in forming the slurry may be illustrated in the following example in which it is assumed that pressurizable container 100 is to be used. To begin, all valves except 105 and 110 are closed and the particulate matter is pumped (or fed by gravity) into container 100 to a predetermined level. Valve 105 is then closed and valve 115 is opened to allow high-pressure gaseous carbon dioxide to flow into container 100 and pressurize it to the desired level. Subsequently, valve 115 is closed and valve 122 is opened to permit liquid carbon dioxide to be pumped into container 100 and to be slurried, by stirring, with the pressurized finely divided matter. After a sufficient quantity of liquid carbon dioxide has been pumped into container 100, valves 122 and 110 are closed and valve 131 is opened to discharge the slurry into main slurry pipeline 12 for transport through the pipeline. By using each pressurizable container in turn in the manner described, it is possible to provide an essentially continuous supply of slurried particulate to pipeline 12. It is, of course, within the scope of this invention to use any number of pressurizable containers in this batch process embodiment.

The pressurized slurry pumped through the main slurry pipeline 12 (FIG. 1) should be maintained at a temperature between about −20° C. and about 30° C. and under a pressure between about 20 atmospheres and about 150 atmospheres. It will be appreciated that within these temperature and pressure ranges, the carbon dioxide is a liquid. Under these conditions, for certain types of materials, there is no appreciable extraction by the liquid carbon dioxide of hydrocarbons, sulfur or other constituents from the particulate matter containing such. Moreover, particulate matter containing alkaline components are left unchanged in composition. Nor is any appreciable quantity of $H_2CO_3$ formed which might present a chemical corrosion problem.

Moreover, the finely divided solids do not agglomerate in liquid carbon dioxide. Rather, the finely divided solids are easily dispersed in liquid carbon dioxide and remains dispersed during dissemination. A typical viscosity of the slurry at about 12.5° C. is approximately one-tenth to one-thirtieth of that of a water slurry at ambient temperature and at the same solids concentration, a fact which materially decreases the friction forces along the slurry pipeline. This, in turn, decreases the pressure drop and hence the power required to pump the slurry. Finally, the finely divided solids can be loaded to a much higher weight percent level in liquid carbon dioxide than in other mediums. For example, it can be loaded up to about 50% to about 55% by weight in water (i.e., one hundred pounds of slurry contains from about 50 to 55 pounds of finely divided particulate) whereas this figure can be as high as about 75 to about 80 in pounds of particulate per 100 pounds of a liquid carbon dioxide slurry. Generally, a loading range of between about 60% and 80% by weight will be preferred in the practice of this invention.

The velocity of the slurry as it is pumped through the pipeline preferably ranges between about 1 and about 6 feet per second, the optimum velocity chosen depending upon such factors as particulate composition, size distribution, ambient temperature, loading level, and the like.

Once the slurry reaches the end of the pipeline, it is necessary to separate the carbon dioxide from the finely divided solid by deslurrying it prior to its being used or placed in storage. In deslurrying it is preferable that no appreciable amount of solid carbon dioxide is formed since it is typically not desirable to introduce this solid material into a storage elevator or into the compartments of transport containers, i.e., a ship or barge. Thus, although it is possible to remove the carbon dioxide by merely releasing the pressure on the slurry, this is not a preferable technique for deslurrying since it results in the formation of solid carbon dioxide with its attendant disadvantages in storage and/or separation.

Since the slurry is a solid-liquid mixture, it is possible to use such conventional dewatering equipment as solid bowl centrifuges or liquid-solid cyclone separators operating under pressure to deslurry the solids. This method has the advantage of requiring a relatively small amount of energy to reliquefy and vaporized carbon dioxide before recycling.

Figure 3:
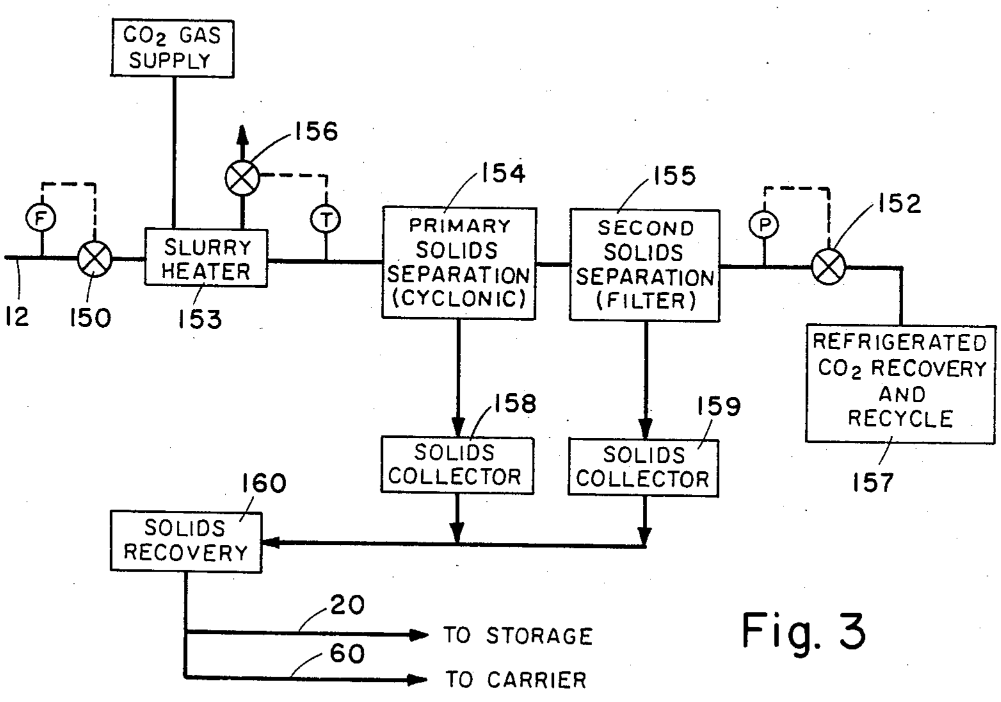
FIG. 3 shows a preferred embodiment of the instant invention for accomplishing the deslurrying step.

FIG. 3 diagrams a preferred method and apparatus for accomplishing the deslurrying step. The apparatus can be seen to comprise three essential elements that control the deslurry operation: the flow control loop F; the temperature control loop T; and the pressure control loop P. The slurry of liquid carbon dioxide and particulate material enters the flow control loop via valve 150 through pipeline 12 where flow is regulated into the slurry heater 153. Heat is added by means of temperature control loop T via valve 156 to the slurry sufficient to expand the solid/liquid slurry in order to vaporize the liquid component. It should be noted that valves 150 and 156 aid in the control of the slurry flow and temperature.

Essentially, this part of the deslurrying operation expands the slurry from pipeline terminus pressure which is from about 900 to about 1000 psig. to the pressure of the deslurrying system (300 to 600 psig.) and heats the slurry (to about 15°-20° F. above the saturation pressure of the system) to form a gas-solid mixture rather than a liquid-solid one. The material leaving the slurry heater and passing into the solids separators 154 and 155 is a substantially free flowing treated particulate solid material in an atmosphere of gaseous carbon dioxide. The pressure of such gaseous material is largely controlled by pressure control loop P via valve 152 which ultimately allows the removal of substantially all the higher than atmospheric pressurized carbon dioxide from the deslurrying system. This carbon dioxide is relatively clean, having little or no particulate matter entrained. However, it does typically contain small amounts of water which are readily removed by, for example, conventional mole sieve dryers (not shown). After drying, the gas is conveniently compressed to pipeline pressure (900-1000 psig.) or more and condensed, the liquified material then being pumped through an appropriate pipeline (not shown) to carbon dioxide storage for recycle. See for example FIGS. 1 and 2. Solid collectors 150 and 159 (only one collector need be used for some particulates) receive the treated material from the separators.

Concerning the solid separators 154 and 155, treated particulate material is removed to the collectors 158, 159 via a "lock hopper system". In the lock hopper system, coal is removed from the cyclone separator to the lock hoppers on a continuous basis, while the lock hoppers themselves operate on an automatic batch cycle basis. In other words, one would have at least two lock hoppers for each cyclone separator. As one lock hopper gets reasonably full of solids, the cyclone separator discharge is switched to the second lock hopper. FIG. 1 shows two lock hoppers removing solids from one cyclone separator. In this system, the first lock hopper vessel is pressurized to 300 to 600 psig. to be at the same pressure as the deslurrying cyclone. Then the gate on top of the vessel is opened and the coal drops into the lock hopper vessel. After the lock hopper vessel is full, as determined by the level switch, the top gate closes and the CO₂ from the lock hopper vessel is taken out through a pipe on the top of the vessel. This leads to the reduction of the pressure in the lock hopper vessel and the removal of CO₂. The vented CO₂ is used to partially pressurize the second lock hopper vessel. Then, additional CO₂ is added to the second lock hopper to bring it to the same pressure as the deslurrying cyclone. The gate at the top of the vessel is opened to continue receiving coal from the deslurrying cyclone. When the first lock hopper vessel reaches atmospheric pressure, the gate at the bottom of the vessel opens and the coal falls into the atmospheric pressure solid recovery silo 160 below. From this silo, dense phase pneumatic transport of coal carries it to its ultimate use point, or to storage.

Recovery is accomplished by moving the solids to the recovery unit 160 after which it can be transported to storage elevators through line 20 or similar storage means and/or immediate use via line 60.

As will be apparent from the following continued description of FIG. 1, several options are available for handling the carbon dioxde, both liquid and gas, recovered in deslurrying.

Returning now to FIG. 1, all or a portion of the deslurried solids may be stored prior to loading onto a carrier; or all or a portion of it may be loaded directly onto the carrier. The deslurried particulate matter which is to be stored is pneumatically transported in line 16 to suitable storage means such as, for example, a series of elevators 17, 18 and 19, through line 20 with suitable branches 21, 22 and 23 controlled by valves 24, 25 and 26. (It will be appreciated that the drawing in FIG. 1 using lines and valves represents a simplification of the system herein described and that it is designed to represent several different embodiments of the invention. The actual choice of lines, and means to control the flow of the various materials therethrough, is well within the skill of the art.)

Sufficient gaseous carbon dioxide is maintained in storage elevators 17-19 to provide a protective blanket over the particulate matter contained therein. The amount of carbon dioxide used will be determined by conventional practice for gas blanketing. The remaining gaseous carbon dioxide used in the pneumatic transport of the finely divided solids is withdrawn through lines 27, 28 an 29 (the flow through which is controlled by valves 30, 31 and 32, respectively), and filters 33, 34 and 35 (which remove entrained coal) into a carbon dioxide recycle line 36 for recycling as a carrying medium. Carbon dioxide gas resulting from the deslurrying step may also be used for this purpose as shown by line 37 of FIG. 1. For the pneumatic pumping of the solids, it is dispersed in the gaseous carbon dioxide from whatever source as it flows through line 16.

When stored particulate matter is to be loaded onto the carrier 40, shown to have a series of compartments 41, 42 and 43, the appropriate valve 44, 45 or 46, associated with elevators 17, 18 and 19, respectively, is opened to discharge the finely divided solids into loading line 47. Carbon dioxide gas, from a source 48, is led into line 47, through line 49 and valve 50, to provide the carrier medium for the solids. Line 47 is movable from carrier compartment to compartment.

As in the case of land-based storage where waterborne carriers are used, the particulate matter in the vessel compartments will have a protective blanket of carbon dioxide in essentially the same amounts that are required in standard practice. This necessitates the removal of the excess gaseous carbon dioxide from the compartments through a suitable line 51 which can lead back to the carbon dioxide gas supply means 48 for recycling.

If all or a portion of the deslurried solid pneumatically carried in line 16 is to be loaded directly onto carrier 40, then the solid gas mixture is taken through line 60, having valve 61, directly to vessel loading line 47 and the appropriate valves in the lines running to and from the storage means are closed. The excess gaseous carbon dioxide is returned from the vessel compartments to carbon dioxide gas supply means 48 as previously described.

It is, of course, within the scope of this invention to discharge all or a portion of the gaseous carbon dioxide into the atmosphere at any suitable point in the system. However it will generally be preferable to maintain the system as an essentially closed, recycling one, both to save any energy which might be required to generate the carbon dioxide lost by such discharging and to ensure that the environment associated with the system remains free from any dust.

As will be seen from FIG. 1, the carbon dioxide recovered from deslurrying which is not used in pneumatic transport of the finely divided material to storage or to a carrier may be handled in one or more of several ways. Thus it may be taken by valved line 70 to carbon dioxide gas supply 48, it may be carried by valved line 71 to a use point, or it may be taken by valved line 72 to a liquefier 73 from where it may be conveyed through line 74 to a use point or through a liquid carbon dioxide pipe line 75, running parallel with the slurry pipeline 12, back to liquid carbon dioxide supply 11 at the source point for use in slurry formation at 10. At the source, all or only makeup carbon dioxide may be supplied from a suitable source 77 and liquefied at 78 for use in slurry formation.

The transport system of FIG. 1 lends itself to well-known techniques to provide a partially or completely automated operation which may be, if desired, controlled by a suitably programmed computer. Such automated control may begin at the source point or at any desired point within the system.

It will be seen that by transporting solids in finely divided particulate form using a unique combination of liquid and gaseous carbon dioxide it is possible to eliminate the need for a vent amount of complicated mechanical equipment heretofore required. Moreover, because of the type of equipment used and the moving of the particulate matter in fluid media, the method and equipment of this invention are particularly suited to automated operation. Finally, the system offers the possibility of being essentially pollution free.

It will thus be seen that the objects set forth, among those made apparent from the preceding description, are efficiently attained and, since certain changes may be made in carrying out the above method and in the constructions set forth without departing from the scope of the invention, it is intended that all matter contained in the above description or shown in the accompanying drawings shall be interpreted as illustrative and not in a limiting sense.

I claim:

1. A process comprising forming a dry free-flowing composition substantially free of flow promoting and anti-agglomerating agents by a. providing an organic or inorganic material in finely divided form;

b. mixing said material with liquid carbon dioxide to form a slurry; and c. separating said mixed material from said slurry.

2. The process in accordance with claim 1 wherein said slurry has a temperature of between about −20° C. to about 30° C. and a pressure of between about 20 and about 100 atmospheres.

3. The process in accordance with claim 2 wherein said finely divided materials have particles sized to pass a U.S. 100-mesh screen.

4. The process in accordance with claim 3 wherein the volume percent of finely divided material in said slurry is between about 30 and about 70 percent.

5. The process in accordance with claim 1 wherein said material is selected from iron ore, limestone, sulfur, potash, copper concentrate, or gelsonite.

6. The process in accordance with claim 1 wherein said separating occurs by expanding said slurry with the addition of heat.

7. The process in accordance with claim 6 wherein said expanded and heated slurry is passed into a cyclone separator having a bag filter mounted thereon and in fluid communication therewith whereby the expanded and heated slurry passes first through the cyclon separator, then through the bag filter.

8. The process in accordance with claim 1 wherein the finely divided material has a particle size distribution of from about 300 μm in diameter to about 40 μm in diameter.

9. The process in accordance with claim 1 wherein said separated material is pneumatically conveyed, the ratio of gas to treated material being from about 1:5 to about 1:50.

10. The process in accordance with claim 9 wherein said pneumatically conveyed material is a fire extinguishant.

11. The process in accordance with claim 1 wherein said material is coal.

12. The process in accordance with claim 11 wherein said separating of said mixed material from said slurry comprises expanding the slurry from a pressure of from about 900 to about 1000 psig. to a pressure of about 300 to about 600 psig. and then heating the slurry to form a gas-solid mixture.

* * * * *

REEXAMINATION CERTIFICATE (889th)

United States Patent [19]

Santhanam

[11] B1 4,546,612

[45] Certificate Issued Jul. 5, 1988

[54] METHOD OF PRODUCING FREE FLOWING SOLIDS

[75] Inventor: Chakra J. Santhanam, Lexington, Mass.

[73] Assignee: Arthur D. Little, Inc., Cambridge, Mass.

Reexamination Request:
No. 90/000,973, Mar. 25, 1986

Reexamination Certificate for:

| | |
|---|---|
| Patent No.: | **4,546,612** |
| Issued: | **Oct. 15, 1985** |
| Appl. No.: | **581,704** |
| Filed: | **Feb. 21, 1984** |

[51] Int. Cl.[4] .................... F17C 7/02
[52] U.S. Cl. .................... 62/55; 137/13; 406/154; 406/197; 423/437
[58] Field of Search .................... 62/46–48, 62/55; 137/13; 302/66; 48/197 R; 423/437; 406/154, 197

[56] References Cited

U.S. PATENT DOCUMENTS 4,206,610 6/1980 Santhanam .................... 62/55
4,377,356 3/1983 Santhanam .................... 406/109

FOREIGN PATENT DOCUMENTS

WO82/01699 5/1982 PCT Int'l Appl. .

OTHER PUBLICATIONS

"Steam/Its Generation and Uses"; Babcock & Wilcox; ©1978.
"Pneumatic Conveying of Bulk Materials"; Wilton N. Klaus/Staff of Chem. Eng. Mag.; p. 11.
Mark's Hndbk, 7th Ed.; pp. 10–81.

*Primary Examiner*—Frank Sever

[57] ABSTRACT

A process as disclosed forming a non-aqueous, free-flowing composition. The process involves treating a finely divided inorganic or organic material with liquid carbon dioxide to form a slurry. The treated material is separated from the slurry and shows suprising free-flowing, nonagglomerated behavior.

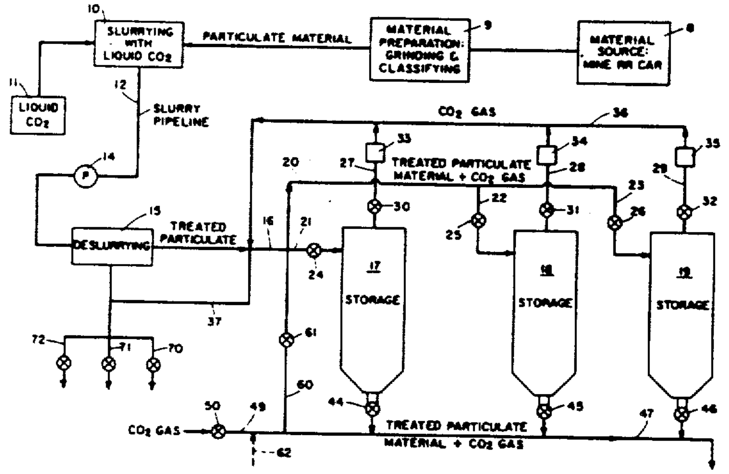

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 2, line 15:

In the method of this invention, liquid and gaseous carbon dioxide is used as a treating agent for the finely divided particulate material. The particulate material forms a pumpable slurry when mixed with the liquid carbon dioxide and subsequent to treatment can be pneumatically conveyed in any medium, such as air, carbon dioxide, etc. *It is understood by those skilled in the powder disseminating art that many materials in powdered form are free-flowing to some extent and they are pneumatically transportable to some extent.* The particles must be sized to pass a U.S. 50-mesh screen, i.e., the particles should be no greater than about 300 μm in diameter. A minor percentage (e.g. up to about 40% by weight) of the materials may be sized fine enough to pass a 325 mesh screen (40 μm in diameter). It is, however, preferable to use a material having a controlled particle size distribution, this distribution being optimized for the viscosity of the liquid carbon dioxide being used as detailed below. The size distribution of the particles should preferably be that which gives rise to a stable slurry, i.e., a slurry from which the particles will not settle out to any appreciable degree. While a mono-disperse system of particles may be used, it should be noted that the particle dispersion, i.e., uniformly sized particles or particles having a range of sizes, is not critical. However, in disseminating uniformly sized particles, velocity distribution must be high enough for suspension of all the particles, but resuspension is less of a problem than with polydispersions. By using particulate that includes minor amounts of fine material, i.e., under 40 μm as well as coarse material, i.e., those passing through a 100 mesh screen, the fines create a liquid viscosity (apparent), that supports the coarse particles, thereby promoting better slurry flow. Similarly, this combination of coarse and fine particles is also advantageous in causing the facile flow of dry particulates treated in accordance with the present invention.

Column 3, line 5:

I have now found that the use of a finely divided inorganic or inorganic material treated with liquid carbon dioxide and used in conjunction with a gaseous medium, such as air or carbon dioxide makes it possible to handle, store, transport and disseminate such materials, in an unexpected, facile manner. *In pneumatic transportation, that is the moving of solids using a gas, conventionally the ratio by weight of solid to gas is about one to seven (1:7).*

AS A RESULT OF REEXAMINATION, IT HAS BEEN DETERMINED THAT:

Claims 1–12 are cancelled.

New claim 13 is added and determined to be patentable.

*13. A process for forming a composition with improved pneumatic transportability and improved free-flowing characteristics substantially free of flow promoting anti-agglomerating agents comprising:*

*(a) providing coal in a finely divided form;*

*(b) treating said coal by mixing with liquid carbon dioxide to form a slurry, said coal being chemically non-reactive with said liquid carbon dioxide;*

*(c) separating said liquid carbon dioxide from said slurry, said composition which remains having improved pneumatic transportability and enhanced free-flowing and non-agglomerating characteristics, and*

*(d) pneumatically conveying said improved composition with gaseous carbon dioxide through a conduit, the weight ratio of said composition to gas being greater than 5 parts of said composition to 1 part of said gaseous carbon dioxide.*

* * * * *